(12) United States Patent
Zoller, IV et al.

(10) Patent No.: US 12,541,406 B2
(45) Date of Patent: Feb. 3, 2026

(54) RESOURCE SCHEDULING OF MULTIPLE APPLICATION TYPES IN A HETEROGENEOUS ENDPOINT DEVICE

(71) Applicant: Dell Products L.P., Round Rock, TX (US)

(72) Inventors: Linwood W. Zoller, IV, Lexington, KY (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 562 days.

(21) Appl. No.: 17/724,197

(22) Filed: Apr. 19, 2022

(65) Prior Publication Data

US 2023/0333911 A1 Oct. 19, 2023

(51) Int. Cl.
*G06F 9/50* (2006.01)

(52) U.S. Cl.
CPC .......... *G06F 9/5077* (2013.01); *G06F 9/5033* (2013.01); *G06F 9/5038* (2013.01); *G06F 9/5044* (2013.01)

(58) Field of Classification Search
None
See application file for complete search history.

(56) References Cited

U.S. PATENT DOCUMENTS

| 8,713,538 | B2* | 4/2014 | Dunne | G06F 11/0718 717/127 |
| 2005/0038835 | A1* | 2/2005 | Chidambaran | G06F 9/485 707/999.203 |
| 2006/0184936 | A1* | 8/2006 | Abels | G06F 9/5077 718/1 |
| 2006/0230405 | A1* | 10/2006 | Fraenkel | G06F 9/505 718/104 |

(Continued)

OTHER PUBLICATIONS

"Learn What's New with DRS in vSphere 7"; https://core.vmware.com/distributed-resource-scheduler; downloaded on Apr. 12, 2022.

(Continued)

*Primary Examiner* — Lewis A Bullock, Jr.
*Assistant Examiner* — Jordan Scott Motter
(74) *Attorney, Agent, or Firm* — Ryan, Mason & Lewis, LLP

(57) ABSTRACT

Techniques are provided for resource scheduling of multiple application types in a heterogeneous endpoint device. One method comprises monitoring an execution of applications on a heterogeneous endpoint device, wherein the applications are of different application types and the heterogeneous endpoint device comprises multiple application runtime systems each supporting a different one of the different application types; and initiating an adjustment of an allocation of resources, provided by the heterogeneous endpoint device, assigned to at least one of the applications based on: (i) a current resource utilization of one or more of the applications, (ii) a priority assigned to one or more of the (Continued)

400

1. LOCAL SCHEDULING ENGINE OF AN ENDPOINT DEVICE MONITORS MULTIPLE APPLICATIONS EXECUTING ACROSS DIFFERENT APPLICATION RUNTIME SYSTEMS;

2. IN RESPONSE TO A CHANGE IN THE RESOURCE UTILIZATION BY AT LEAST ONE OF THE MULTIPLE APPLICATIONS THAT VIOLATES ONE OR MORE PREDEFINED RESOURCE UTILIZATION CRITERIA, THE LOCAL SCHEDULING ENGINE (I) OBTAINS A SERVICE LEVEL OBJECTIVE OF ONE OR MORE OF THE MULTIPLE APPLICATIONS ON THE ENDPOINT DEVICE AND (II) DETERMINES WHETHER A CURRENT RESOURCE UTILIZATION BY ONE OR MORE OF THE MULTIPLE APPLICATIONS EXCEEDS AN APPLICABLE UPPER RESOURCE UTILIZATION THRESHOLD;

3. THE LOCAL SCHEDULING ENGINE DYNAMICALLY ADJUSTS, OR INSTRUCTS THE APPLICATION RUNTIME SYSTEM THAT EXECUTES AN APPLICATION TYPE OF THE ONE OR MORE APPLICATIONS TO ADJUST, AN ALLOCATION OF RESOURCES OF THE ONE OR MORE APPLICATIONS; AND

4. LOCAL SCHEDULING ENGINE NOTIFIES THE GLOBAL SCHEDULING ENGINE OF THE DYNAMIC ADJUSTMENT TO THE ALLOCATION OF RESOURCES OF THE ONE OR MORE APPLICATIONS.

applications and/or (iii) a resource threshold value assigned to one or more of the applications. A global scheduling engine may: (i) monitor multiple endpoint devices and/or (ii) deploy one or more applications to at least one endpoint device based on resource consumption information from the endpoint devices.

20 Claims, 7 Drawing Sheets

(56) References Cited

U.S. PATENT DOCUMENTS

| | | | | |
|---|---|---|---|---|
| 2007/0101320 A1* | 5/2007 | Tang | ............ | G06F 8/441 |
| | | | | 717/149 |
| 2012/0079497 A1* | 3/2012 | Gangemi | ............ | G06F 9/5011 |
| | | | | 718/104 |
| 2013/0198371 A1* | 8/2013 | Branson | ............ | G06F 9/5088 |
| | | | | 709/224 |
| 2013/0332935 A1* | 12/2013 | Varma | ............ | G06F 11/301 |
| | | | | 718/104 |
| 2022/0318674 A1* | 10/2022 | Shukla | ............ | G06N 20/00 |
| 2024/0163228 A1 | 5/2024 | Fujita et al. | | |

OTHER PUBLICATIONS

"Kubernetes Scheduler"; https://kubernetes.io/docs/concepts/scheduling-eviction/kube-scheduler/; downloaded on Apr. 12, 2022.
Sobol, Ron, "A Deep Dive into Kubernetes Scheduling"; https://thenewstack.io/a-deep-dive-into-kubernetes-scheduling/; dated Nov. 30, 2020; downloaded on Apr. 12, 2022.

* cited by examiner

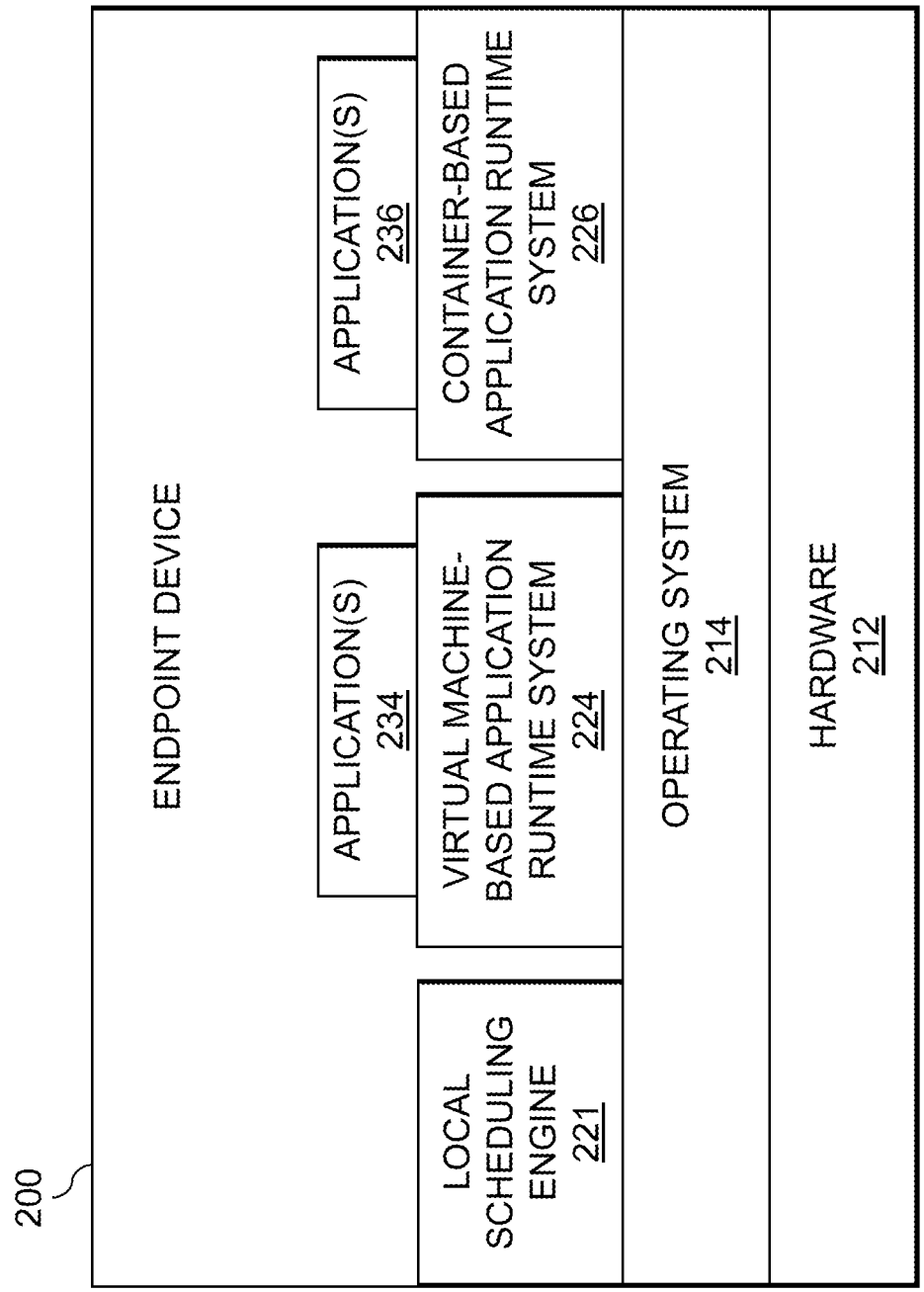

300

1. USER SELECTS AT LEAST ONE APPLICATION FROM A CATALOG OF DEFINED APPLICATIONS AND AN ENDPOINT DEVICE WHERE THE SELECTED APPLICATION SHOULD EXECUTE;

2. GLOBAL SCHEDULING ENGINE ASSESSES CURRENT RESOURCE UTILIZATION OF THE SELECTED ENDPOINT DEVICE USING RESOURCE INFORMATION PROVIDED BY THE SELECTED ENDPOINT DEVICE TO DETERMINE IF RESOURCES NEEDED BY SELECTED APPLICATION CAN BE PROVIDED BY SELECTED ENDPOINT DEVICE BASED AT LEAST IN PART ON (I) SERVICE LEVEL OBJECTIVES OF SELECTED APPLICATION AND OTHER APPLICATIONS CURRENTLY EXECUTING ON THE SELECTED ENDPOINT AND/OR (II) UPPER RESOURCE UTILIZATION THRESHOLD OF THE SELECTED ENDPOINT; AND

3. DEPLOYMENT MODULE DEPLOYS THE SELECTED APPLICATION TO THE SELECTED ENDPOINT BASED AT LEAST IN PART ON A RESULT OF THE ASSESSMENT.

1. LOCAL SCHEDULING ENGINE OF AN ENDPOINT DEVICE MONITORS MULTIPLE APPLICATIONS EXECUTING ACROSS DIFFERENT APPLICATION RUNTIME SYSTEMS;

2. IN RESPONSE TO A CHANGE IN THE RESOURCE UTILIZATION BY AT LEAST ONE OF THE MULTIPLE APPLICATIONS THAT VIOLATES ONE OR MORE PREDEFINED RESOURCE UTILIZATION CRITERIA, THE LOCAL SCHEDULING ENGINE (I) OBTAINS A SERVICE LEVEL OBJECTIVE OF ONE OR MORE OF THE MULTIPLE APPLICATIONS ON THE ENDPOINT DEVICE AND (II) DETERMINES WHETHER A CURRENT RESOURCE UTILIZATION BY ONE OR MORE OF THE MULTIPLE APPLICATIONS EXCEEDS AN APPLICABLE UPPER RESOURCE UTILIZATION THRESHOLD;

3. THE LOCAL SCHEDULING ENGINE DYNAMICALLY ADJUSTS, OR INSTRUCTS THE APPLICATION RUNTIME SYSTEM THAT EXECUTES AN APPLICATION TYPE OF THE ONE OR MORE APPLICATIONS TO ADJUST, AN ALLOCATION OF RESOURCES OF THE ONE OR MORE APPLICATIONS; AND

4. LOCAL SCHEDULING ENGINE NOTIFIES THE GLOBAL SCHEDULING ENGINE OF THE DYNAMIC ADJUSTMENT TO THE ALLOCATION OF RESOURCES OF THE ONE OR MORE APPLICATIONS.

FIG. 4

RESOURCE SCHEDULING OF MULTIPLE APPLICATION TYPES IN A HETEROGENEOUS ENDPOINT DEVICE

FIELD

The field relates generally to information processing, and more particularly to allocating resources in information processing systems.

BACKGROUND

Information processing systems increasingly utilize virtual resources to meet changing user needs in an efficient, flexible and cost-effective manner. For example, cloud computing systems implemented using virtual resources such as virtual machines and containers have been widely adopted. Such virtual resources may be used to provide at least a portion of the virtualization infrastructure of a given information processing system. However, significant challenges can arise in the scheduling of resources among applications of different application types in such information processing systems.

SUMMARY

Illustrative embodiments of the present disclosure provide techniques for resource scheduling of multiple application types in a heterogeneous endpoint device. As used herein, a heterogeneous endpoint device comprises any endpoint device having multiple application runtime systems each supporting a different application type.

One method comprises monitoring, by a scheduling engine of a heterogeneous endpoint device, an execution of at least two applications on the heterogeneous endpoint device, wherein the at least two applications are of different application types and wherein the heterogeneous endpoint device comprises at least two application runtime systems each supporting a different one of the different application types; and dynamically initiating, by the scheduling engine, an adjustment of an allocation of resources, provided by the heterogeneous endpoint device, assigned to at least one of the at least two applications based at least in part on one or more of (i) a current resource utilization of one or more of the at least two applications, (ii) a priority assigned to one or more of the at least two applications and (iii) a resource threshold value assigned to one or more of the at least two applications.

In some embodiments, a notification of the initiating of the adjustment of the allocation of resources can be provided to a global scheduling engine that monitors a plurality of endpoint devices comprising the heterogeneous endpoint device. The plurality of endpoint devices may provide application resource consumption information to the global scheduling engine and the global scheduling engine may generate a resource utilization forecast for at least one of the plurality of endpoint devices. The global scheduling engine may initiate (i) a movement of one or more applications to another endpoint device based at least in part on the resource utilization forecast; and/or (ii) one or more automated remedial actions in response to receiving the notification.

In one or more embodiments, the global scheduling engine may deploy one or more applications to at least one of the plurality of endpoint devices based at least in part on the resource consumption information from at least some of the plurality of endpoint devices.

These and other illustrative embodiments include, without limitation, methods, apparatus, networks, systems and processor-readable storage media.

BRIEF DESCRIPTION OF THE DRAWINGS

FIG. 2 illustrates a heterogeneous endpoint device in an illustrative embodiment;

FIG. 3 illustrates exemplary pseudo code for an application deployment process that employs global resource scheduling in an illustrative embodiment;

FIG. 4 illustrates exemplary pseudo code for an operations process that allocates resources among multiple application types in an illustrative embodiment;

DETAILED DESCRIPTION

Figure 1:
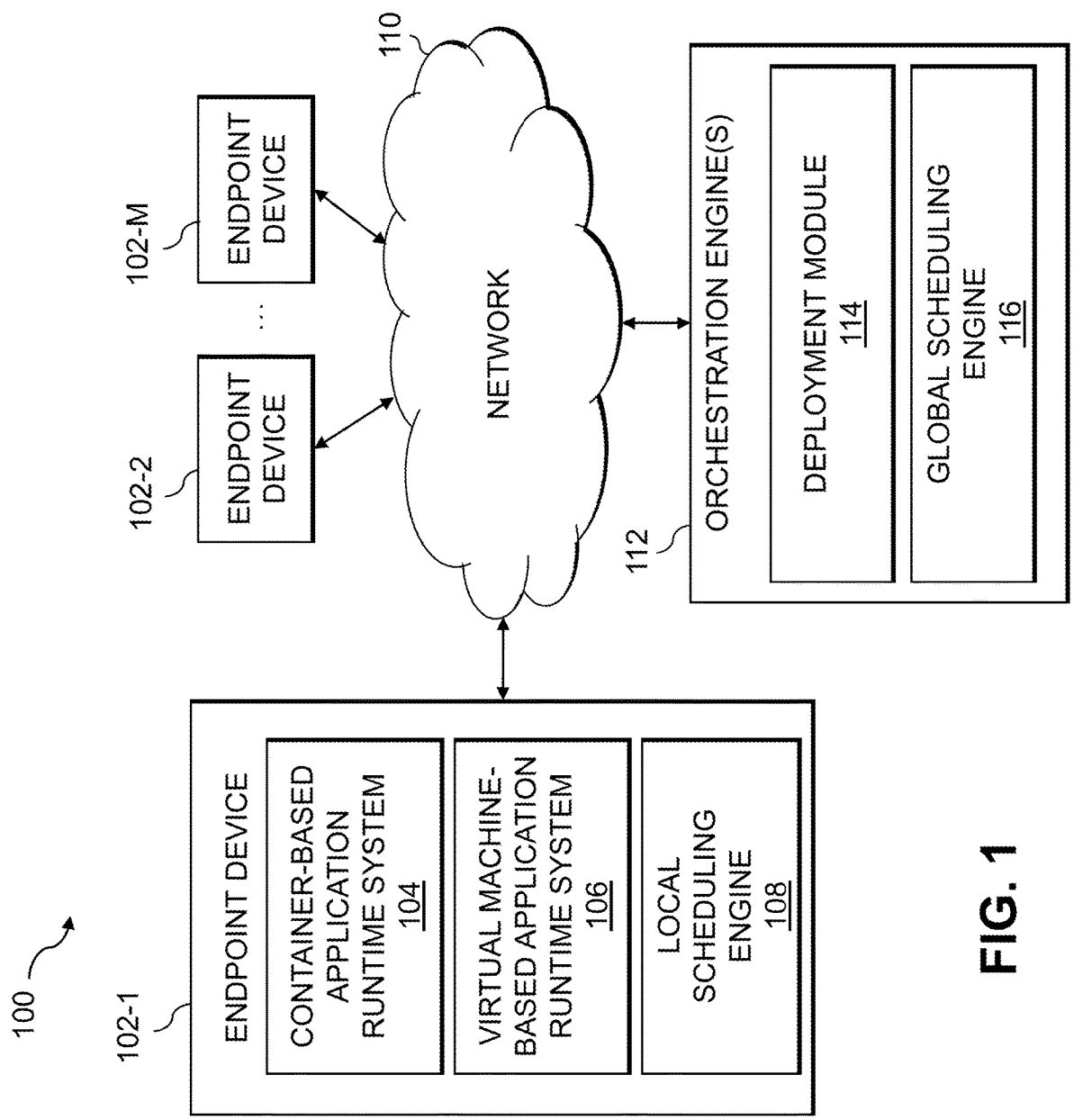
FIG. 1 is a block diagram of an information processing system for resource scheduling of multiple application types in a heterogeneous endpoint device in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

A distributed set of endpoint computing devices may employ multiple application types having different underlying technologies. It may be necessary to coordinate the deployment of applications with different application types, such that the resources needed by one application of a given application type are not negatively impacted by the resources needed by another application of a different type. In addition to coordinating such deployments, it may also be necessary to continually monitor the execution of the deployed applications and to ensure that each executing application continues to receive the necessary resources while not negatively impacting other applications.

One difficulty in the deployment of multiple application types, and the allocation of resources among such multiple application types, is that the multiple application types are managed by separate resource scheduling systems that are not aware of each other. Thus, the application runtime system associated with each application type believes that it has exclusive rights to the system resources.

For example, applications running on virtual machines (VMs) are supported by numerous application runtime systems, such as KVM (Kubernetes VM) hypervisors, Xen hypervisors, Hyper-V hypervisors and VMware™ ESXi™ hypervisors. Likewise, applications running on containers may also have different application runtime systems (such as a contained application runtime system), as well as an orchestration system, such as a Docker Compose tool for defining and running multiple container Docker applications and Kubernetes container application runtime systems. An exemplary endpoint device running three virtual machines under KVM, for example, that consume 60% of the resources of the endpoint device, does not currently have a mechanism to determine if there is enough additional capacity remaining to accommodate an incoming container that requests an additional 30% of the resources of the endpoint device (and the container application runtime system is also not aware of the resource consumption by the applications running under KVM).

One or more embodiments of the disclosure provide techniques for deploying and allocating resources among multiple application types across multiple endpoint devices. In some embodiments, each endpoint device comprises a local scheduling engine that can look across multiple different application runtime systems and assess the real-time utilization of resources. In addition, a global scheduling engine component resides, for example, inside a control plane and uses the resource utilization information from multiple endpoint devices to implement resource-aware application placement and deployment to multiple endpoint devices.

In at least some embodiments, the global scheduling engine may generate a resource utilization forecast and/or analytic information for at least one of the endpoint devices, based on application resource consumption information provided to the global scheduling engine by one or more of the endpoint devices.

FIG. 1 shows an information processing system 100 configured in accordance with an illustrative embodiment to deploy and allocate resources among multiple application types. The information processing system 100 comprises one or more endpoint devices 102-1, 102-2, . . . 102-M (collectively, endpoint devices 102) and an orchestration engine 112 that communicate over a network 110. The endpoint devices 102 and orchestration engine 112 illustratively comprise respective computers, servers or other types of processing devices. For example, at least a subset of the endpoint devices 102 may be implemented as edge endpoint computing devices or respective virtual machines of a compute services platform or other type of processing platform. In at least some embodiments, each endpoint device 102 may be a homogeneous endpoint device supporting one application type or a heterogeneous endpoint device supporting multiple application types.

The endpoint devices 102 in such an arrangement illustratively provide compute services such as execution of one or more applications on behalf of each of one or more users associated with respective ones of the endpoint devices 102. In an edge endpoint computing device implementation, for example, the edge endpoint computing device may comprise internal storage for storing data associated with one or more applications executing on the respective edge endpoint computing device. Thus, in at least some embodiments, the edge endpoint computing device does not need to consume storage from an external storage array.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be at least partially implemented outside of the cloud infrastructure context, as in the case of a stand-alone computing and storage system implemented within a given enterprise.

In the information processing system 100 of FIG. 1, the exemplary endpoint device 102-1 is an example of a heterogeneous endpoint device supporting multiple application types and comprises a container-based application runtime system 104, a virtual machine-based application runtime system 106 and a local scheduling engine 108. Each of the application runtime systems comprise a runtime environment that implements portions of an execution model (e.g., software that executes a certain type of application) and is compatible with one or more downstream endpoint devices.

The local scheduling engine 108 may allocate resources among the applications of one or more application types of the respective endpoint device 102. In addition, the local scheduling engine 108 may provide (i) notifications of any adjustments of the allocation of resources and/or (ii) application resource consumption information to a global scheduling engine, discussed below.

At least portions of the functionality of the container-based application runtime system 104, the virtual machine-based application runtime system 106 and the local scheduling engine 108 of the representative endpoint device 102-1 may be implemented at least in part in the form of software that is stored in memory and executed by a processor.

The additional endpoint devices 102-2 and 102-M in the example of FIG. 1 may each be a homogeneous endpoint device supporting one application type or a heterogeneous endpoint devices supporting multiple application types. Additional details of a representative endpoint device will be discussed further below in conjunction with FIG. 2.

In the FIG. 1 embodiment, the orchestration engine 112 includes a deployment module 114 and a global scheduling engine 116. The deployment module 114 is configured in some embodiments to deploy one or more applications and/or services to one or more of the endpoint devices 102. The deployment module 114 may allow a user or a process to select a given application inside the control plane (e.g., the orchestration engine 112) and to deploy the selected application to one or more endpoint devices 102. In this manner, the application is defined in a control plane, where the resource requirements of the application, in the form of allocated capacity, currently exists.

The global scheduling engine 116 may be configured to record and analyze application resource consumption information from the various local scheduling engines 108 and perform intelligent analytics on the application resource consumption information to provide forecasting data allowing, for example, application rescheduling based on seasonality, forecasting and proactive movement.

The orchestration engine 112 may be implemented, for example, using the Kubernetes orchestration service, as modified herein to provide the features and functions of the present invention.

At least portions of the functionality of the deployment module 114 and the global scheduling engine 116 may be implemented at least in part in the form of software that is stored in memory and executed by a processor.

The endpoint devices 102 and orchestration engine 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The endpoint devices 102 and the orchestration engine 112 (or one or more components thereof such as the deployment module 114 and/or the global scheduling engine 116) may be implemented on respective distinct processing platforms, although numerous other arrangements are possible. For example, in some embodiments at least portions of one or more of the endpoint devices 102 and the orchestration engine 112 are implemented on the same processing platform. The orchestration engine 112 can therefore be implemented at least in part within at least one processing platform that implements at least a subset of the endpoint devices 102.

The network 110 may be implemented using multiple networks of different types to interconnect storage system components. For example, the network 110 may be a portion of a global computer network such as the Internet, although other types of networks can be employed including a wide area network (WAN), a local area network (LAN), a satellite network, a telephone or cable network, a cellular network, a wireless network such as a WiFi or WiMAX network, or various portions or combinations of these and other types of networks. The network 110 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The term "processing platform" as used herein is intended to be broadly construed so as to encompass, by way of illustration and without limitation, multiple sets of processing devices and one or more associated storage systems that are configured to communicate over one or more networks. For example, distributed implementations of the endpoint devices 102 are possible, in which certain ones of the endpoint devices 102 reside in one data center in a first geographic location while other ones of the endpoint devices 102 reside in one or more other data centers in one or more other geographic locations that are potentially remote from the first geographic location. The orchestration engine 112 may be implemented at least in part in the first geographic location, the second geographic location, and one or more other geographic locations. Thus, it is possible in some implementations of the system 100 for different ones of the endpoint devices 102 and the orchestration engine 112 to reside in different data centers.

Numerous other distributed implementations of the endpoint devices 102 and/or the orchestration engine 112 are possible. Accordingly, the endpoint devices 102 and/or the orchestration engine 112 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 for resource scheduling of multiple application types in a heterogeneous endpoint device is presented by way of illustrative example only, and in other embodiments additional or alternative elements may be used. Thus, another embodiment may include additional or alternative systems, devices and other network entities, as well as different arrangements of modules and other components.

For example, the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

It is to be appreciated that these and other features of illustrative embodiments are presented by way of example only, and should not be construed as limiting in any way.

FIG. 2 illustrates a representative heterogeneous endpoint device 200 in further detail in an illustrative embodiment. In the example of FIG. 2, the exemplary heterogeneous endpoint device 200 comprises an operating system 214 that runs on hardware 212. In addition, the operating system 214 supports a local scheduling engine 221, a virtual machine-based application runtime system 224 and a container-based application runtime system 226. The local scheduling engine 221, virtual machine-based application runtime system 224 and container-based application runtime system 226 are on the same hierarchical level in the example of FIG. 2 (e.g., deployed as part of the operating system itself or as an added module).

As shown in FIG. 2, virtual machine-based applications 234 run on virtual machine-based application runtime system 224 and container-based applications 236 run on container-based application runtime system 226. Thus, the two exemplary application runtime systems 224, 226 each support a different application type.

In the example of FIG. 2, the heterogeneous endpoint device 200 comprises the local scheduling engine 221 that monitors an execution of applications on the multiple different application runtime systems 224, 226 and assess the real-time utilization of resources by the applications executing on the different application runtime systems 224, 226. In addition, the local scheduling engine 221 can dynamically initiate an adjustment of an allocation of resources, provided by the heterogeneous endpoint device 200, assigned to at least one of the applications based on (i) a current resource utilization of one or more of the applications, (ii) a priority assigned to one or more of the applications and/or (iii) a resource threshold value assigned to one or more of the applications. The adjustment of the allocation of resources may be performed by the local scheduling engine 221 or the application runtime system that supports the application type of the application associated with the resource allocation adjustment.

In some embodiments, the local scheduling engine 221 may also provide a notification of the adjustment of the allocation of resources to the global scheduling engine 116 that monitors multiple endpoint devices 102. The local scheduling engine 221 may also provide application resource consumption information to the global scheduling engine 116, such as per-application or per-endpoint device resource consumption information.

FIG. 3 illustrates exemplary pseudo code for an application deployment process 300 that employs global resource scheduling in an illustrative embodiment. In such a provisioning workflow, an exemplary endpoint device has zero or more applications currently deployed and a new, incoming application may be requested from the centralized control plane (e.g., the orchestration engine 112 of FIG. 1). The control plane must decide which of the eligible endpoint devices are capable of running the application based upon one or more inputs, such as resource requirements of the application.

In the embodiment of FIG. 3, the steps of the process 300 are assumed to be performed by one or more components of the orchestration engine 112, such as the deployment module 114 and/or the global scheduling engine 116. In step 1, the user selects at least one application from a catalog of defined applications and an endpoint device where the selected application should execute (for example, using a graphical user interface of the orchestration engine 112).

The global scheduling engine 116 assesses a current resource utilization of the selected endpoint device using resource information provided by the selected endpoint device to determine if resources needed by the selected application can be provided by the selected endpoint device based at least in part on (i) service level objectives of the selected application and other applications currently executing on the selected endpoint and/or (ii) an upper resource utilization threshold of the selected endpoint.

In step 3, the deployment module 114 deploys the selected application to the selected endpoint based at least in part on a result of the assessment.

FIG. 4 illustrates exemplary pseudo code for an operations process 400 that allocates resources among multiple application types in an illustrative embodiment. In such an operations workflow, a heterogeneous endpoint device has two or more applications currently deployed and running under different application runtime systems. As the workloads are already running, the job of the local scheduling engine 108 is to monitor the heterogeneous endpoint device and ensure that the actual resources being consumed are as expected and do not negatively impact a service level objective or otherwise impact healthy operations of the endpoint device and the applications executing on the endpoint device.

In the embodiment of FIG. 4, the steps of the process 400 are assumed to be performed by one or more components of a given endpoint device 102, such as the local scheduling engine 108. In step 1, the local scheduling engine of an endpoint device monitors multiple applications executing across different application runtime systems. In response to a change in the resource utilization by at least one of the multiple applications that violates one or more predefined resource utilization criteria in step 2, the local scheduling engine (i) obtains a service level objective of one or more of the multiple applications on the endpoint device and (ii) determines whether a current resource utilization by one or more of the applications exceeds an applicable upper resource utilization threshold.

In step 3, the local scheduling engine dynamically adjusts, or instructs the application runtime system that executes an application type of the one or more applications, an allocation of resources of the one or more applications. The local scheduling engine 108 notifies the global scheduling engine 116 in step 4 of the dynamic adjustment to the allocation of resources of the one or more applications.

Figure 5:
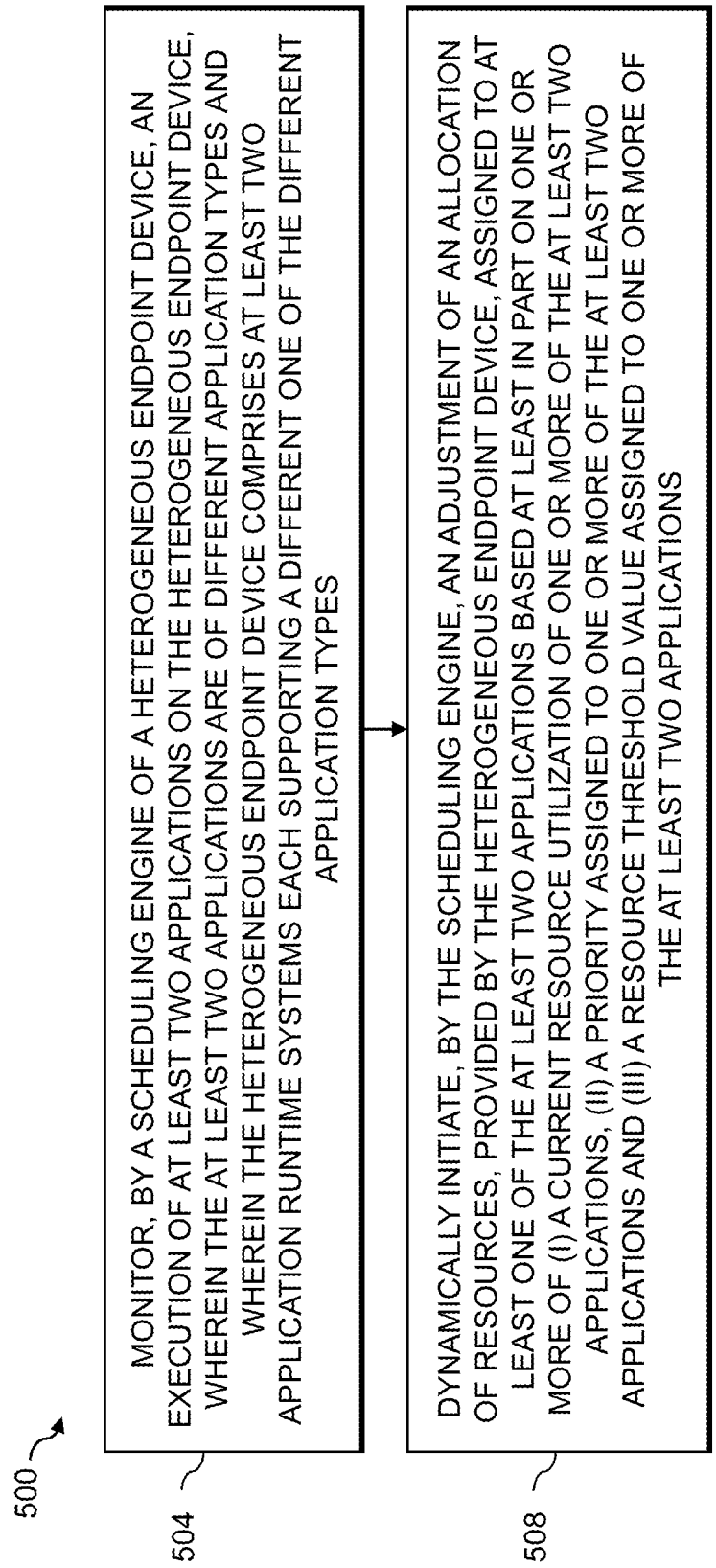
FIG. 5 is a flow diagram illustrating an exemplary implementation of a resource scheduling process that allocates resources among multiple application types in a heterogeneous endpoint device in an illustrative embodiment.

FIG. 5 is a flow diagram illustrating an exemplary implementation of a resource scheduling process 500 that allocates resources among multiple application types in a heterogeneous endpoint device in an illustrative embodiment. In the example of FIG. 5, the process 500 includes steps 504 and 508. These steps are assumed to be performed by the local scheduling engine 221 of a heterogeneous endpoint device 200.

The process 500 begins at step 504, where a scheduling engine monitors an execution of at least two applications on the heterogeneous endpoint device, wherein the at least two applications are of different application types and wherein the heterogeneous endpoint device comprises at least two application runtime systems each supporting a different one of the different application types In step 508, the local scheduling engine dynamically initiates an adjustment of an allocation of resources, provided by the heterogeneous endpoint device, assigned to at least one of the at least two applications based at least in part on one or more of (i) a current resource utilization of one or more of the at least two applications, (ii) a priority assigned to one or more of the at least two applications and (iii) a resource threshold value assigned to one or more of the at least two applications.

In some embodiments, the adjustment of the allocation of resources assigned to the at least one application may be performed by one or more of: (i) the local scheduling engine and (ii) the application runtime system that supports the application type of the at least one application.

In one or more embodiments, the scheduling engine may also provide a notification of the initiating of the adjustment of the allocation of resources to a global scheduling engine that monitors a plurality of endpoint devices comprising the heterogeneous endpoint device. The endpoint devices may also provide application resource consumption information to the global scheduling engine and the global scheduling engine may generate a resource utilization forecast for at least one of the plurality of endpoint devices.

The global scheduling engine may initiate a movement of one or more applications, in at least some embodiments, to another endpoint device based at least in part on the resource utilization forecast. In addition, the global scheduling engine may initiate one or more automated remedial actions in response to receiving the notification. For example, the automated remedial actions may comprise: (i) initiating a movement of one or more of the at least two applications to another endpoint device, and/or (ii) suspending an execution of one or more of the at least two applications and subsequently resuming the execution of the one or more of the at least two applications.

In some embodiments, the global scheduling engine may deploy one or more applications to at least one of the plurality of endpoint devices based at least in part on the resource consumption information from at least some of the plurality of endpoint devices.

The particular processing operations and other system functionality described in conjunction with the pseudo code and flow diagrams of FIGS. 3 through 5 are presented by way of illustrative example only and should not be construed as limiting the scope of the disclosure in any way. Alternative embodiments can use other types of processing operations for resource scheduling of multiple application types in a heterogeneous endpoint device. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different selective storage drive powering processes for respective different storage nodes of an information processing system.

Advantageously, the techniques for global resource scheduling and resource allocation among multiple application types described herein allow proactive rescheduling and/or migration of applications based upon forecasting of application resource consumption. For example, since the local scheduling engine components record resource consumption information and make this available to a global scheduling engine in the control plane (e.g., in the orchestration engine 112), a periodic (e.g., end-of-month) data warehouse process can be executed for one or more applications and determine that a given application consumes up to its limit of resources on a certain day each month. If enough of these patterns have been observed, there may be some correlation between them. If there is a strong degree of such correlation, it can be forecasted with varying degrees of accuracy that the same application will experience at least similar loads at similar point(s) in the future. The control plane can anticipate this load and, for example, depending on policy, either suspend and reschedule, or migrate, the application to other eligible endpoints.

Among other benefits, the techniques for resource allocation among multiple application types described herein provide for disparate runtime introspection and forecasting of resource consumption (e.g., on a heterogeneous endpoint device) and/or a throttling or adjustment of running workloads using per-runtime logic. In some embodiments, the resource allocations of multiple applications may be dynamically adjusted based, for example, on policy-based objectives.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for resource scheduling of multiple application types in a heterogeneous endpoint device will now be described in greater detail with reference to FIGS. 6 and 7. Although described in the context of system 100, these platforms may also be used to implement at least portions of other information processing systems in other embodiments.

Figure 6:
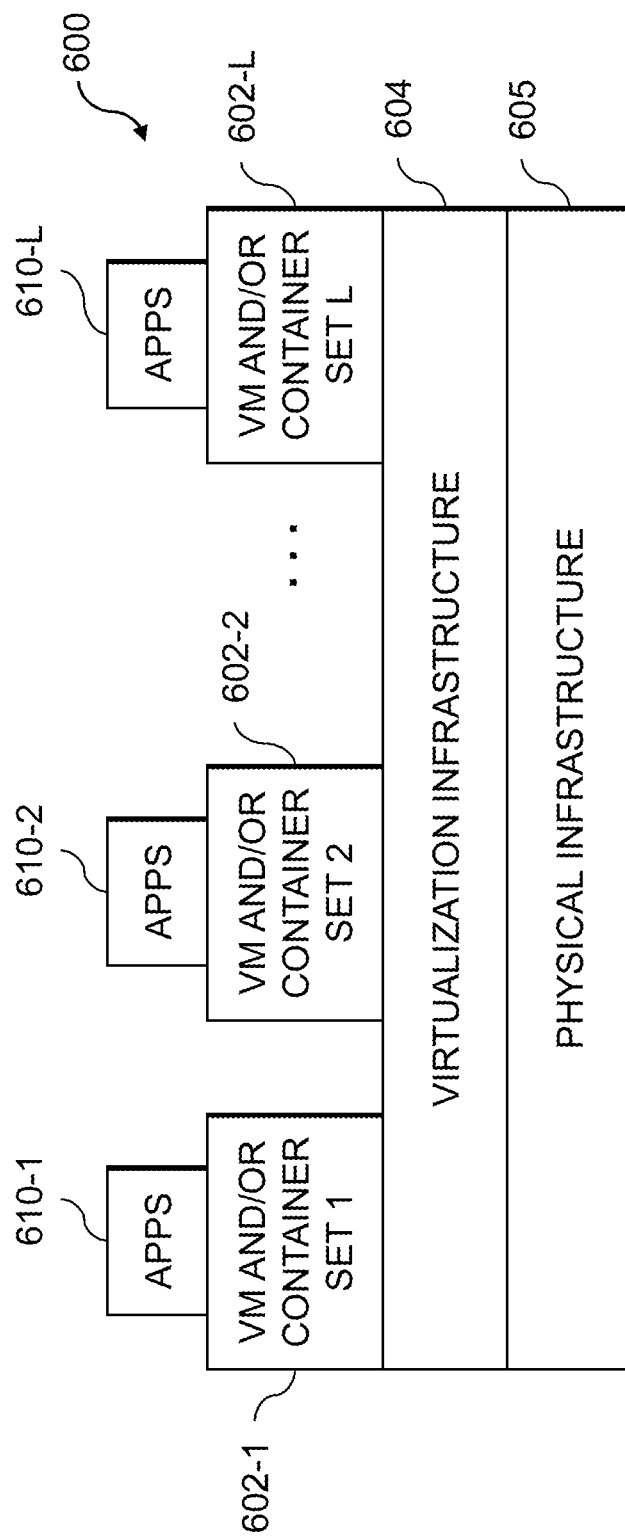
FIGS. 6 and 7 show examples of processing platforms that may be utilized to implement at least a portion of an information processing system in illustrative embodiments.
Figure 7:
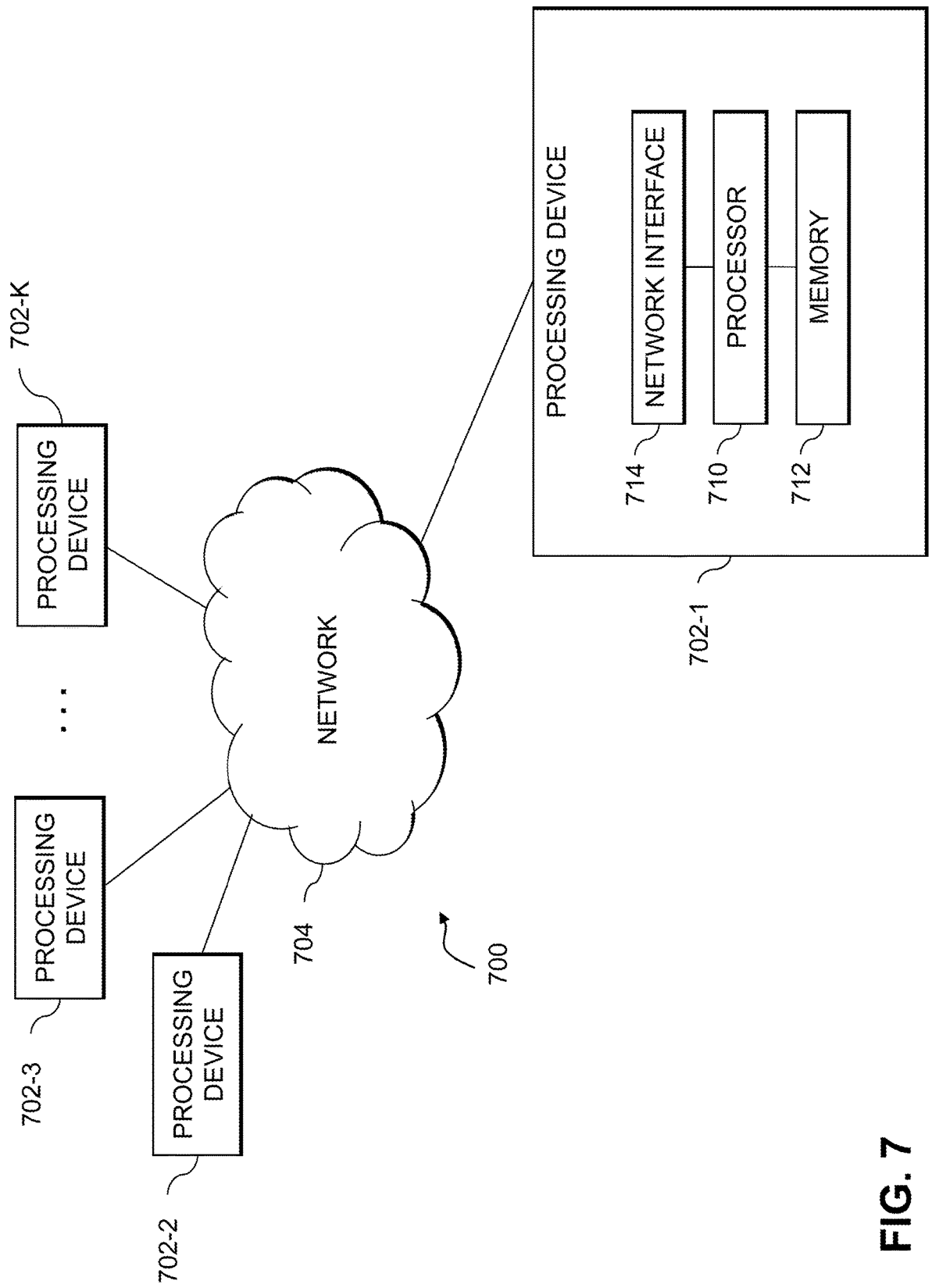

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for resource scheduling of multiple application types in a heterogeneous endpoint device as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container orchestrators, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    monitoring, by a first scheduling engine of a first heterogeneous endpoint device, of a plurality of heterogeneous endpoint devices, an execution of at least two applications on the first heterogeneous endpoint device, wherein the at least two applications are of different application types and wherein the first heterogeneous endpoint device comprises at least two application runtime systems each supporting a different one of the different application types, wherein the at least two application runtime systems comprise a container-based application runtime system, that executes one or more container-based applications, and a virtual machine-based application runtime system, that executes one or more virtual machine-based applications, wherein each of the plurality of heterogeneous endpoint devices comprises a respective scheduling engine and wherein the respective scheduling engines (i) monitor a utilization of resources by the one or more container-based applications executed by a respective container-based application runtime system and the one or more virtual machine-based applications executed by a respective virtual machine-based application runtime system operating on their respective heterogeneous endpoint device and (ii) provide application resource consumption information to a global scheduling engine, and wherein the global scheduling engine deploys one or more incoming applications to at least one of the plurality of heterogeneous endpoint devices based at least in part on the application resource consumption information from at least some of the plurality of heterogeneous endpoint devices; and
    determining, by the first scheduling engine, an adjustment of an allocation of resources, provided by the first heterogeneous endpoint device, assigned to at least one of the at least two applications based at least in part on one or more of (i) a current resource utilization of one or more of the at least two applications associated with the first heterogeneous endpoint device, (ii) a priority assigned to one or more of the at least two applications associated with the first heterogeneous endpoint device and (iii) a resource threshold value assigned to one or more of the at least two applications associated with the first heterogeneous endpoint device;
    wherein the determining comprises:
    performing an assessment of the current resource utilization of the first heterogeneous endpoint device, by the first scheduling engine, wherein the current resource utilization of the first heterogeneous endpoint device includes an evaluation of one or more of: (i) one or more service level objectives of at least two applications currently executing on the first heterogeneous endpoint device and (ii) at least one designated resource utilization threshold of the first heterogeneous endpoint device; and
    based on the assessment of the current resource utilization:
    initiating, by the first scheduling engine, the determined adjustment of the allocation of resources assigned to the at least one of the at least two applications of the first heterogeneous endpoint device;
    providing a notification of the adjustment of the allocation of resources; and
    initiating, by the global scheduling engine, one or more automated remedial actions, wherein at least one of the one or more automated remedial actions comprises initiating a movement of one or more of the at least two applications to another heterogeneous endpoint device;
    wherein the method is performed by at least one processing device comprising a processor coupled to a memory.

2. The method of claim 1, wherein the adjustment of the allocation of resources assigned to the at least one application is performed by one or more of: (i) the first scheduling engine and (ii) the application runtime system of the first heterogeneous endpoint device that supports the application type of the at least one application.

3. The method of claim 1, wherein the global scheduling engine generates a resource utilization forecast for at least one of the plurality of heterogeneous endpoint devices based at least in part on the application resource consumption information provided to the global scheduling engine by one or more of the plurality of heterogeneous endpoint devices.

4. The method of claim 3, wherein the global scheduling engine initiates the movement of the one or more applications to the other heterogeneous endpoint device based at least in part on the resource utilization forecast.

5. The method of claim 1, wherein the global scheduling engine initiates the one or more automated remedial actions in response to receiving the notification.

6. The method of claim 1, wherein one or more of the automated remedial actions further comprise suspending an execution of one or more of the at least two applications and subsequently resuming the execution of the one or more of the at least two applications.

7. The method of claim 1, wherein the global scheduling engine assesses a current resource utilization of a selected heterogeneous endpoint device using resource information provided by the selected heterogeneous endpoint device to determine whether the selected heterogeneous endpoint device can provide resources needed by the deployed incoming application based at least in part on an evaluation of one or more of: (i) one or more service level objectives of the deployed incoming application and service level objectives of at least one other application currently executing on the selected heterogeneous endpoint device and (ii) at least one designated resource utilization threshold of the selected heterogeneous endpoint device.

8. An apparatus comprising:
at least one processing device comprising a processor coupled to a memory;
the at least one processing device being configured to implement the following steps:
monitoring, by a first scheduling engine of a first heterogeneous endpoint device, of a plurality of heterogeneous endpoint devices, an execution of at least two applications on the first heterogeneous endpoint device, wherein the at least two applications are of different application types and wherein the first heterogeneous endpoint device comprises at least two application runtime systems each supporting a different one of the different application types, wherein the at least two application runtime systems comprise a container-based application runtime system, that executes one or more container-based applications, and a virtual machine-based application runtime system, that executes one or more virtual machine-based applications, wherein each of the plurality of heterogeneous endpoint devices comprises a respective scheduling engine and wherein the respective scheduling engines (i) monitor a utilization of resources by the one or more container-based applications executed by a respective container-based application runtime system and the one or more virtual machine-based applications executed by a respective virtual machine-based application runtime system operating on their respective heterogeneous endpoint device and (ii) provide application resource consumption information to a global scheduling engine, and wherein the global scheduling engine deploys one or more incoming applications to at least one of the plurality of heterogeneous endpoint devices based at least in part on the application resource consumption information from at least some of the plurality of heterogeneous endpoint devices; and
determining, by the first scheduling engine, an adjustment of an allocation of resources, provided by the first heterogeneous endpoint device, assigned to at least one of the at least two applications based at least in part on one or more of (i) a current resource utilization of one or more of the at least two applications associated with the first heterogeneous endpoint device, (ii) a priority assigned to one or more of the at least two applications associated with the first heterogeneous endpoint device and (iii) a resource threshold value assigned to one or more of the at least two applications associated with the first heterogeneous endpoint device;
wherein the determining comprises:
performing an assessment of the current resource utilization of the first heterogeneous endpoint device, by the first scheduling engine, wherein the current resource utilization of the first heterogeneous endpoint device includes an evaluation of one or more of: (i) one or more service level objectives of at least two applications currently executing on the first heterogeneous endpoint device and (ii) at least one designated resource utilization threshold of the first heterogeneous endpoint device; and
based on the assessment of the current resource utilization:
initiating, by the first scheduling engine, the determined adjustment of the allocation of resources assigned to the at least one of the at least two applications of the first heterogeneous endpoint device;
providing a notification of the adjustment of the allocation of resources; and
initiating, by the global scheduling engine, one or more automated remedial actions, wherein at least one of the one or more automated remedial actions comprises initiating a movement of one or more of the at least two applications to another heterogeneous endpoint device.

9. The apparatus of claim 8, wherein the global scheduling engine generates a resource utilization forecast for at least one of the plurality of heterogeneous endpoint devices based at least in part on the application resource consumption information provided to the global scheduling engine by one or more of the plurality of heterogeneous endpoint devices.

10. The apparatus of claim 9, wherein the global scheduling engine initiates the movement of the one or more applications to the other heterogeneous endpoint device based at least in part on the resource utilization forecast.

11. The apparatus of claim 8, wherein the global scheduling engine initiates the one or more automated remedial actions in response to receiving the notification.

12. The apparatus of claim 8, wherein the global scheduling engine assesses a current resource utilization of a selected heterogeneous endpoint device using resource information provided by the deployed incoming heterogeneous endpoint device to determine whether the selected heterogeneous endpoint device can provide resources needed by the selected application based at least in part on an evaluation of one or more of: (i) one or more service level objectives of the deployed incoming application and service level objectives of at least one other application currently executing on the selected heterogeneous endpoint device and (ii) at least one designated resource utilization threshold of the selected heterogeneous endpoint device.

13. The apparatus of claim 8, wherein the adjustment of the allocation of resources assigned to the at least one application is performed by one or more of: (i) the first scheduling engine and (ii) the application runtime system of the first heterogeneous endpoint device that supports the application type of the at least one application.

14. The apparatus of claim 8, wherein the one or more of the automated remedial actions further comprise suspending an execution of one or more of the at least two applications and subsequently resuming the execution of the one or more of the at least two applications.

15. A non-transitory processor-readable storage medium having stored therein program code of one or more software programs, wherein the program code when executed by at least one processing device causes the at least one processing device to perform the following steps:
monitoring, by a first scheduling engine of a first heterogeneous endpoint device, of a plurality of heterogeneous endpoint devices, an execution of at least two applications on the first heterogeneous endpoint device, wherein the at least two applications are of different application types and wherein the first heterogeneous endpoint device comprises at least two application runtime systems each supporting a different one of the different application types, wherein the at least two application runtime systems comprise a container-based application runtime system, that executes one or more container-based applications, and a virtual machine-based application runtime system, that executes one or more virtual machine-based applications, wherein each of the plurality of heterogeneous endpoint devices comprises a respective scheduling engine and wherein the respective scheduling engines (i) monitor a utilization of resources by the one or more container-based applications executed by a respective container-based application runtime system and the one or more virtual machine-based applications executed by a respective virtual machine-based application runtime system operating on their respective heterogeneous endpoint device and (ii) provide application resource consumption information to a global scheduling engine, and wherein the global scheduling engine deploys one or more incoming applications to at least one of the plurality of heterogeneous endpoint devices based at least in part on the application resource consumption information from at least some of the plurality of heterogeneous endpoint devices; and
determining, by the first scheduling engine, an adjustment of an allocation of resources, provided by the first heterogeneous endpoint device, assigned to at least one of the at least two applications based at least in part on one or more of (i) a current resource utilization of one or more of the at least two applications associated with the first heterogeneous endpoint device, (ii) a priority assigned to one or more of the at least two applications associated with the first heterogeneous endpoint device and (iii) a resource threshold value assigned to one or more of the at least two applications associated with the first heterogeneous endpoint device;
wherein the determining comprises:
performing an assessment of the current resource utilization of the first heterogeneous endpoint device, by the first scheduling engine, wherein the current resource utilization of the first heterogeneous endpoint device includes an evaluation of one or more of: (i) one or more service level objectives of at least two applications currently executing on the first heterogeneous endpoint device and (ii) at least one designated resource utilization threshold of the first heterogeneous endpoint device; and
based on the assessment of the current resource utilization:
initiating, by the first scheduling engine, the determined adjustment of the allocation of resources assigned to the at least one of the at least two applications of the first heterogeneous endpoint device;
providing a notification of the adjustment of the allocation of resources; and
initiating, by the global scheduling engine, one or more automated remedial actions, wherein at least one of the one or more automated remedial actions comprises initiating a movement of one or more of the at least two applications to another heterogeneous endpoint device.

16. The non-transitory processor-readable storage medium of claim 15, wherein the global scheduling engine generates a resource utilization forecast for at least one of the plurality of heterogeneous endpoint devices based at least in part on the application resource consumption information provided to the global scheduling engine by one or more of the plurality of heterogeneous endpoint devices.

17. The non-transitory processor-readable storage medium of claim 16, wherein the global scheduling engine initiates the movement of the one or more applications to the other heterogeneous endpoint device based at least in part on the resource utilization forecast.

18. The non-transitory processor-readable storage medium of claim 15, wherein the global scheduling engine initiates the one or more automated remedial actions in response to receiving the notification and wherein the one or more of the automated remedial actions further comprise suspending an execution of one or more of the at least two applications and subsequently resuming the execution of the one or more of the at least two applications.

19. The non-transitory processor-readable storage medium of claim 15, wherein the global scheduling engine assesses a current resource utilization of a selected heterogeneous endpoint device using resource information provided by the selected heterogeneous endpoint device to determine whether the selected heterogeneous endpoint device can provide resources needed by the deployed incoming application based at least in part on an evaluation of one or more of: (i) one or more service level objectives of the deployed incoming application and service level objectives of at least one other application currently executing on the selected heterogeneous endpoint device and (ii) at least one designated resource utilization threshold of the selected heterogeneous endpoint device.

20. The non-transitory processor-readable storage medium of claim 15, wherein the adjustment of the allocation of resources assigned to the at least one application is performed by one or more of: (i) the first scheduling engine and (ii) the application runtime system of the first heterogeneous endpoint device that supports the application type of the at least one application.

* * * * *